US006324962B1

(12) United States Patent
Majkrzak (10) Patent No.: US 6,324,962 B1
(45) Date of Patent: Dec. 4, 2001

(54) VALVE BLOCK MOUNTING ARRANGEMENT

(75) Inventor: David Majkrzak, West Fargo, ND (US)

(73) Assignee: Crary Company, West Fargo, ND (US)

( * ) Notice: Subject to any disclaimer, the term of this patent is extended or adjusted under 35 U.S.C. 154(b) by 0 days.

(21) Appl. No.: 09/546,074

(22) Filed: Apr. 10, 2000

(51) Int. Cl.[7] ............................... F01B 31/00; F16L 39/00
(52) U.S. Cl. .......................................... 92/163; 285/124.5
(58) Field of Search .................. 92/163, 164; 285/124.1, 285/124.3, 124.4, 125.5, 190

(56) References Cited

U.S. PATENT DOCUMENTS

| | | | |
|---|---|---|---|
| 2,510,125 | * 6/1950 | Meakin | 285/124.1 X |
| 3,673,541 | * 6/1972 | Volinskie | 285/119 X |
| 4,089,549 | * 5/1978 | Vyse et al. | 285/124.4 |

* cited by examiner

*Primary Examiner*—John Ryznic
(74) *Attorney, Agent, or Firm*—Michael S. Neustel (57) ABSTRACT

A valve block mounting arrangement for mounting a valve block directly to the ports of a hydraulic motor. The inventive device includes a main body having a first bore, a second bore and a cartridge bore. The first bore and the second are substantially parallel to one another with the cartridge bore intersecting the parallel bores and designed for removably receiving a control cartridge. A first female coupler and a second female coupler are rotatably positioned within the bores for connecting to a pair of corresponding hydraulic hoses. A first male coupler and a second male coupler are rotatably positioned within the bores opposite of the female couplers for threadably securing to the first port and second port of a rear ported hydraulic motor. The female couplers are preferably connected to the male couplers thereby allowing an individual to apply a tool to the female couplers to rotate the male couplers into the ports of the hydraulic motor. O-rings are positioned about the female couplers and the male couplers for preventing passage of hydraulic fluid about the couplers during operation. A conventional O-ring is positioned about each of the male couplers for reducing the likelihood of leakage during operation. In an alternative embodiment, the female couplers are permanently secured within the bores while the male couplers include an extended portion for allowing a tool to manipulate for rotating the male couplers into the ports of the hydraulic motor. Once installed upon the hydraulic motor, the user may interchange the control cartridge depending upon the type of valve they desire to create. It can be appreciated that one or more of the present inventions can be attached to the female couplers in a stacked configuration.

18 Claims, 6 Drawing Sheets

Remote Hose Mounting

Block Valve Mounting

Conventional Systems

VALVE BLOCK MOUNTING ARRANGEMENT

BACKGROUND OF THE INVENTION

1. Field of the Invention

The present invention relates generally to valve block devices and more specifically it relates to a valve block mounting arrangement for mounting a valve block directly to the ports of a hydraulic motor.

Hydraulic motors are commonly utilized to drive various items such as fans. Most hydraulic motors include a first port and a second port that receive and return the hydraulic fluid utilized to drive the hydraulic motor. Typically, hydraulic motors are susceptible to cavitation and other usage damage.

There are two basic designs for hydraulic motor ports. The first design includes a pair of "same side" ports that are positioned into the same side of the hydraulic motor. The ports are typically interiorly threaded for receiving a threaded male coupler for connecting an elongated hydraulic hose to each of the ports. The ports also typically include a recessed portion for receiving a conventional O-ring. Some of these hydraulic motors include a plurality of interiorly threaded apertures for receiving a corresponding plurality of threaded fasteners for directly securing a block valve directly to the hydraulic motor. For a block valve assembly or other connection device to be utilized with the hydraulic motor, the plurality of threaded apertures must be present within the hydraulic motor.

The second design for hydraulic motors includes a pair of opposite side ports that are interiorly threaded. The user connects a threaded male coupler into the interiorly threaded ports for connecting a length of hydraulic hoses thereto. Some of these hydraulic motors include a plurality of interiorly threaded apertures for receiving a corresponding plurality of threaded fasteners for directly securing a block valve directly to the hydraulic motor. For a block valve assembly or other connection device to be utilized with the hydraulic motor, the plurality of threaded apertures must be present within the hydraulic motor.

2. Description of the Prior Art

Valve devices for hydraulic motors have been in use for years. Typically, a remote hose mounting valve assembly is comprised of a valve connected between a first hydraulic hose and a second hydraulic hose that are connected to the ports of a hydraulic motor so that the valve is fluidly connected in parallel with respect to the hydraulic motor. The most common type of valve utilized between the hydraulic hoses is a check valve.

Another type of valve device is known as the "block valve" The block valve has a main body typically constructed of metal that is bored to receive two hydraulic hoses and a control cartridge. As is well-known in the art, the control cartridge determines the operation of the valve assembly when connected to the hydraulic motor. Various types of valves may be utilized within this configuration such as a check valve, a relief valve, an on/off valve, and a speed control bypass valve. There are various types of two-way, three-way and four-way configurations for a valve that can be utilized also in conjunction with the hydraulic motor for allowing the desired control of the hydraulic motor.

The main problem with conventional remote hose mounting valve assemblies is that they are extremely cumbersome and require a significant amount of room to be utilized in conjunction with the hydraulic motor. In addition, many hydraulic motors do not have a plurality of threaded apertures for receiving threaded fasteners thereby eliminating the possibility of utilizing a direct mount valve block assembly which requires the user to purchase a new hydraulic motor if a valve block assembly is desired to be utilized.

Examples of patented valve block assemblies include U.S. Pat. No. 5,590,525 to Kandil; U.S. Pat. No. 5,809,781 to Krantz; U.S. Pat. No. 5,197,284 to Cartner; U.S. Pat. No. 4,694,649 to Howeth; U.S. Pat. No. 5,421,155 to Hirata et al.; U.S. Pat. No. 5,259,192 to Karakama et al. which are all illustrative of such prior art.

Kandil (U.S. Pat. No. 5,590,525) discloses a method of preventing cavitation in an axial piston pump during an aiding load and system and valve employing the same. Kandil specifically discloses preventing cavitation in a hydraulic motor of the axial piston type comprising the steps of recirculating hydraulic fluid from the supply port to the return port when the motor is subject to an aiding load.

Krantz (U.S. Pat. No. 5,809,781) discloses a neutral flow by-pass valve for hydrostatic transmission. Krantz specifically discloses an essentially closed conduit comprising a pair of bores and a channel communicating the pair of bores, all formed in the cam ring of the transmission.

Cartner (U.S. Pat. No. 5,197,284) discloses a hydraulic motor deceleration system. Cartner specifically teaches a pump, a hydraulic motor and a motor hydraulic circuit interconnecting the pump and the motor for selectively allowing the flow of fluid between the pump and the motor inlet.

Howeth (U.S. Pat. No. 4,694,649) discloses a pressure limiting acceleration control system and valve for hydraulic motors. Howeth specifically teaches a control system for operating positive displacement hydraulic motors to minimize pressure peaks and stresses associated therewith upon starting a motor.

While these devices may be suitable for the particular purpose to which they address, they are not as suitable for mounting a valve block directly to the ports of a hydraulic motor. Conventional valve block devices do not allow mounting to a hydraulic motor without threaded apertures thereby requiring replacement of the hydraulic motor if utilization of a valve block is to occur.

In these respects, the valve block mounting arrangement according to the present invention substantially departs from the conventional concepts and designs of the prior art, and in so doing provides an apparatus primarily developed for the purpose of mounting a valve block directly to the ports of a hydraulic motor.

SUMMARY OF THE INVENTION

In view of the foregoing disadvantages inherent in the known types of valve blocks now present in the prior art, the present invention provides a new valve block mounting arrangement construction wherein the same can be utilized for mounting a valve block directly to the ports of a hydraulic motor.

The general purpose of the present invention, which will be described subsequently in greater detail, is to provide a new valve block mounting arrangement that has many of the advantages of the valve block devices mentioned heretofore and many novel features that result in a new valve block mounting arrangement which is not anticipated, rendered obvious, suggested, or even implied by any of the prior art valve block devices, either alone or in any combination thereof.

To attain this, the present invention generally comprises a main body having a first bore, a second bore and a cartridge bore. The first bore and the second are substantially parallel to one another with the cartridge bore intersecting the parallel bores and designed for removably receiving a control cartridge. A first female coupler and a second female coupler are rotatably positioned within the bores for connecting to a pair of corresponding hydraulic hoses. A first male coupler and a second male coupler are rotatably positioned within the bores opposite of the female couplers for threadably securing to the first port and second port of a rear ported hydraulic motor. The female couplers are preferably connected to the male couplers thereby allowing an individual to apply a tool to the female couplers to rotate the male couplers into the ports of the hydraulic motor. O-rings are positioned about the female couplers and the male couplers for preventing passage of hydraulic fluid about the couplers during operation. A conventional O-ring is positioned about each of the male couplers for reducing the likelihood of leakage during operation. In an alternative embodiment, the female couplers are permanently secured within the bores while the male couplers include an extended portion for allowing a tool to manipulate for rotating the male couplers into the ports of the hydraulic motor. Once installed upon the hydraulic motor, the user may interchange the control cartridge depending upon the type of valve they desire to create. It can be appreciated that one or more of the present inventions can be attached to the female couplers in a stacked configuration.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a valve block mounting arrangement that will overcome the shortcomings of the prior art devices.

A further object is to provide a valve block mounting arrangement for mounting a valve block directly to the ports of a hydraulic motor.

Another object is to provide a valve block mounting arrangement that allows an individual to attach a valve block directly to any hydraulic motor with interior threaded ports.

An additional object is to provide a valve block mounting arrangement that eliminates the need for the user to purchase a new hydraulic motor when mounting a valve block assembly is desired.

A further object is to provide a valve block mounting arrangement that reduces the total number of connections associated with a remote hose mounting system.

Another object is to provide a valve block mounting arrangement that reduces the likelihood of leakage occurring between the hydraulic motor and the hydraulic system.

A further object is to provide a valve block mounting arrangement that can be easily mounted and removed from the ports of a hydraulic motor.

Another object is to provide a valve block mounting arrangement that positions the valve assembly closer to the motor.

An additional object is to provide a valve block mounting arrangement that can utilize any well-known valve arrangement including, but not limited to, check valve, a relief valve, an on/off valve, and a speed control bypass valve.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become filly appreciated as the same becomes better understood when considered in conjunction with the accompanying drawings, in which like reference characters designate the same or similar parts throughout the several views, and wherein.

DESCRIPTION OF THE PREFERRED EMBODIMENT

Turning now descriptively to the drawings, in which similar reference characters denote similar elements throughout the several views, FIGS. 1 through 7 illustrate a valve block mounting arrangement 10, which comprises a main body 20 having a first bore 30, a second bore 32 and a cartridge 70 bore. The first bore 30 and the second are substantially parallel to one another with the cartridge 70 bore intersecting the parallel bores and designed for removably receiving a control cartridge 70. A first female coupler 40 and a second female coupler 50 are rotatably positioned within the bores for connecting to a pair of corresponding hydraulic hoses. A first male coupler 42 and a second male coupler 52 are rotatably positioned within the bores opposite of the female couplers for threadably securing to the first port 18 and second port 19 of a rear ported hydraulic motor 12. The female couplers 40, 50 are preferably connected to the male couplers 42, 52 thereby allowing an individual to apply a tool to the female couplers 40, 50 to rotate the male couplers 42, 52 into the ports of the hydraulic motor 12. O-rings are positioned about the female couplers 40, 50 and the male couplers 42, 52 for preventing passage of hydraulic fluid about the couplers 40, 42, 50, 52 during operation. Conventional thread sealants or a conventional O-ring is positioned about each of the male couplers 42, 52 for reducing the likelihood of leakage during operation. In an alternative embodiment, the female couplers 40, 50 are permanently secured within the bores 30, 32 while the male couplers 42, 52 include an extended portion for allowing a tool to manipulate for rotating the male couplers 42, 52 into the ports 18, 19 of the hydraulic motor 12. Once installed upon the hydraulic motor 12, the user may interchange the control cartridge 70 depending upon the type of valve they desire to create. It can be appreciated that one or more of the present inventions can be attached to the female couplers 40, 50 in a stacked configuration.

Figure 1:
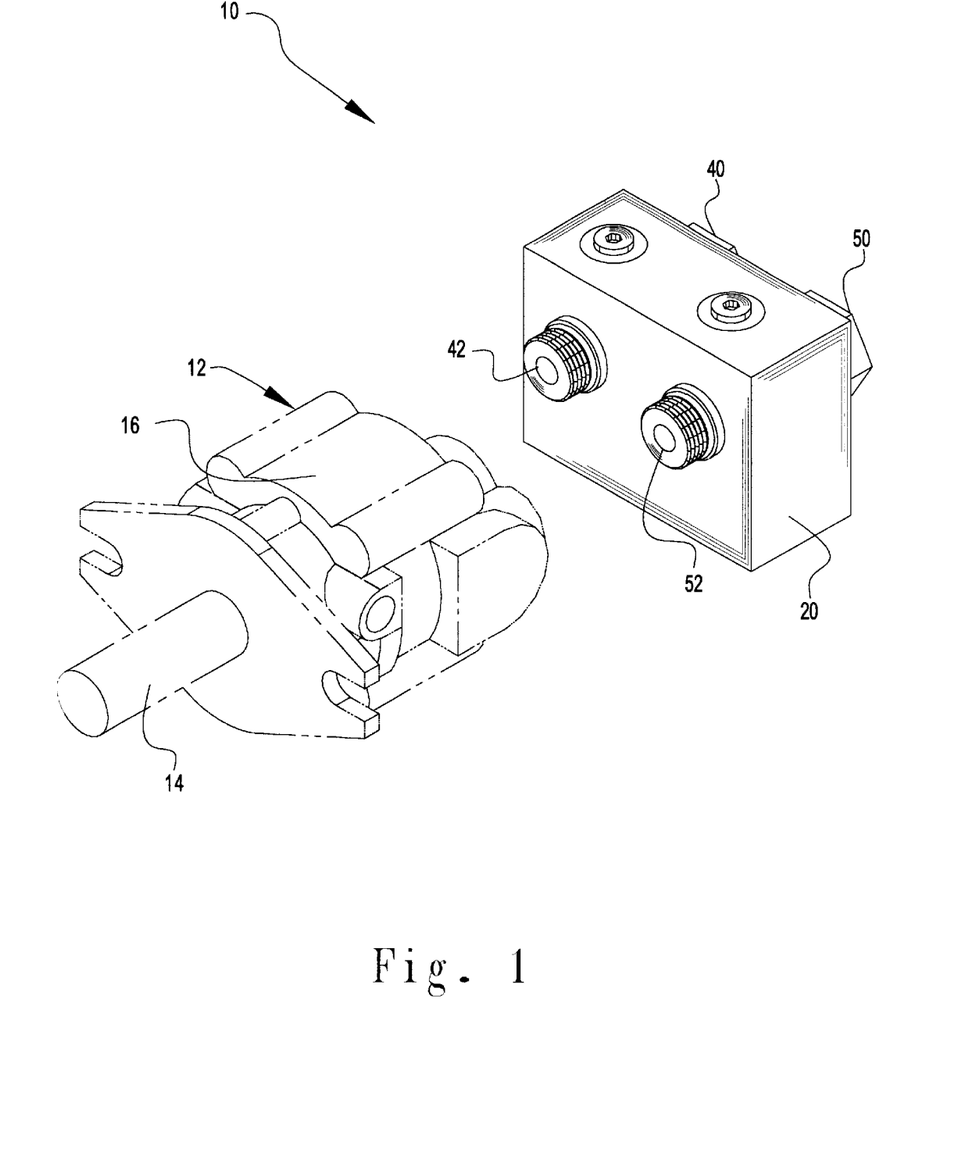
FIG. 1 is a front upper perspective view of the present invention in relation to a hydraulic motor.
Figure 2:
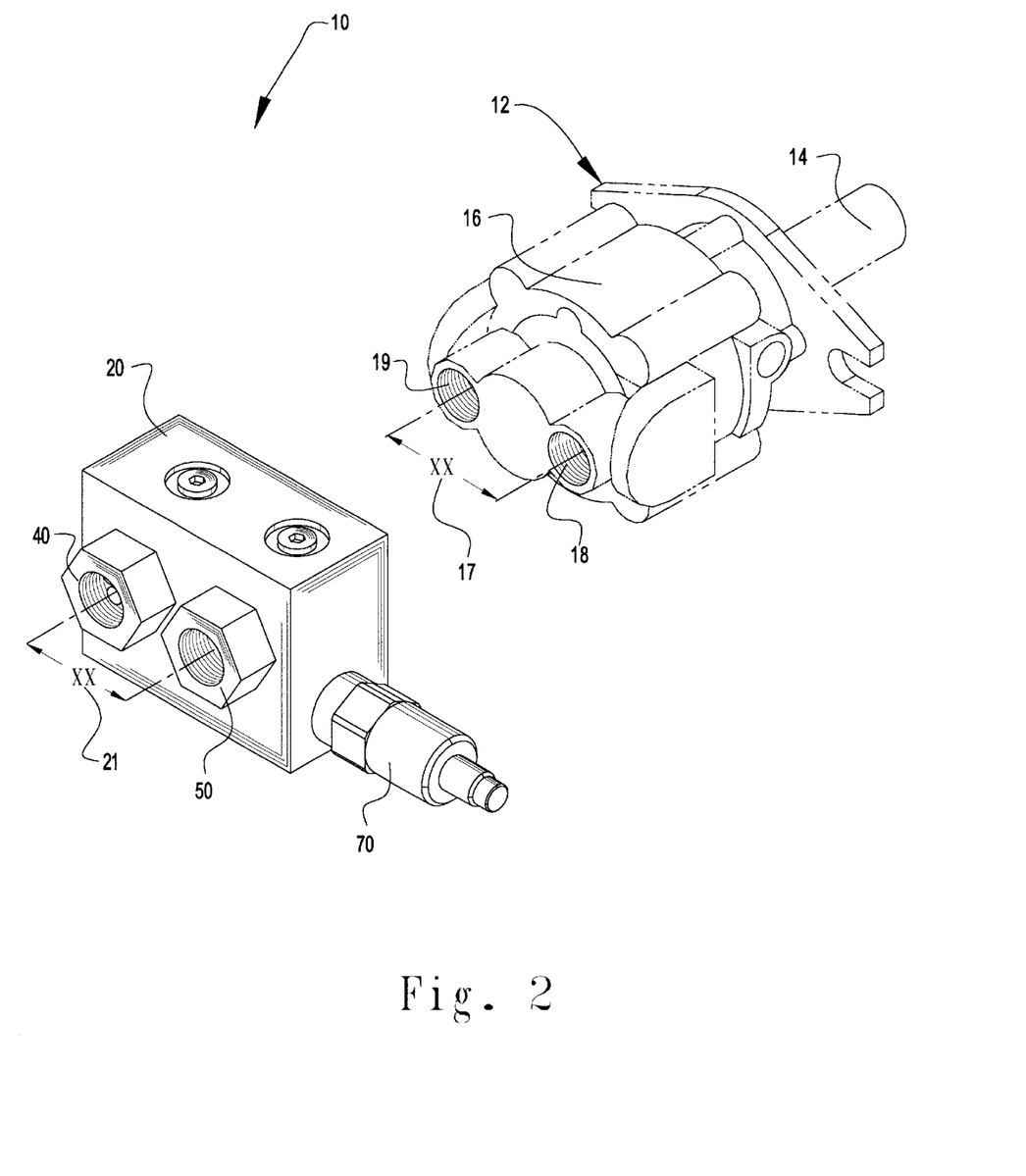
FIG. 2 is a rear upper perspective view of the present invention in relation to a hydraulic motor.

As shown in FIGS. 1 and 2 of the drawings, a conventional hydraulic motor 12 typically includes a housing 16 and drive shaft 14 rotatably extending from the housing 16. The conventional hydraulic motor 12 further includes a first port 18 and a second port 19 for receiving a hydraulic hose. The first port 18 and the second port 19 are usually interiorly threaded for threadably receiving a threaded male coupler. The ports 18, 19 are further positioned upon the same side of the hydraulic motor 12 adjacent to one another.

As shown in FIGS. 1 through 7 of the drawings, the main body 20 is comprised of a generally solid body. The main body 20 may be constructed of any well-known material such as, but not limited to, aluminum. The main body 20 may be comprised of any shape such as, but not limited to, square or rectangular. The main body 20 has a front portion and a rear portion, wherein the front portion is formed to fit about housing 16 of the of the hydraulic motor 12 when the female couplers 40, 50 are engaged within the ports 18, 19. The rear portion of the main body 20 receives the male couplers 42, 52 as best shown in FIG. 2 of the drawings.

Figure 5:
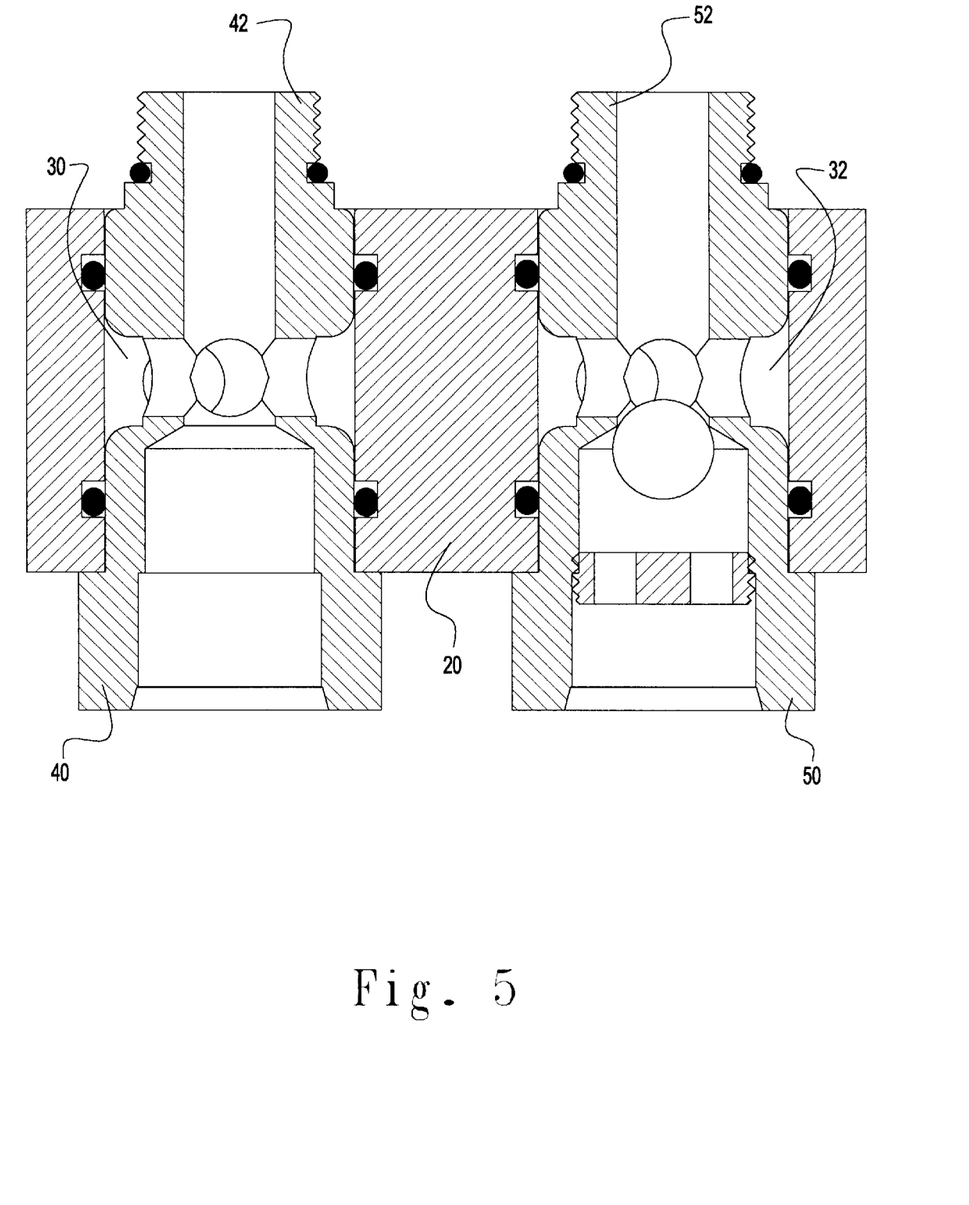
FIG. 5 is a cross sectional view taken along line 5—5 of FIG. 4.
Figure 6:
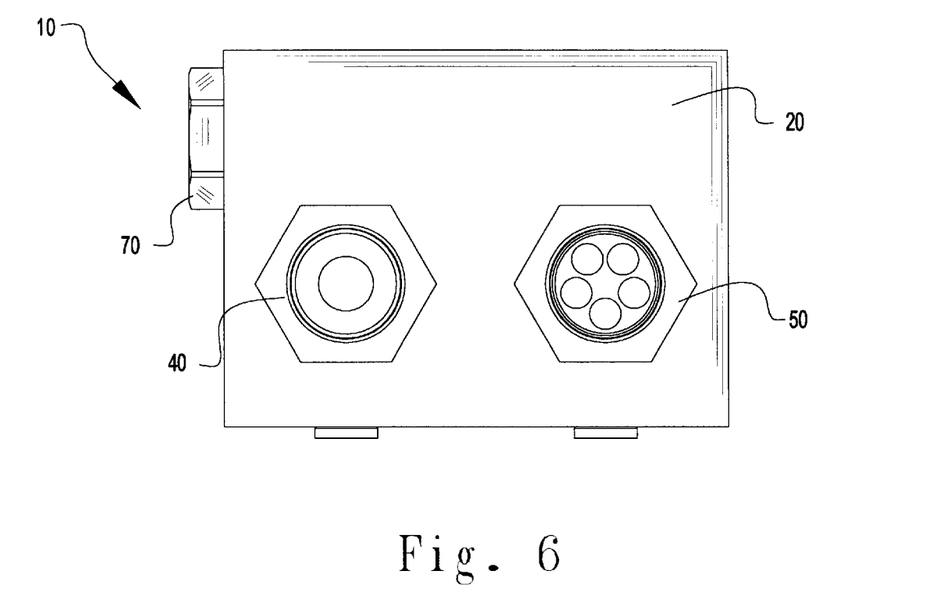
FIG. 6 is a rear view of the present invention with a control cartridge positioned within comprised of a check valve.
Figure 7:
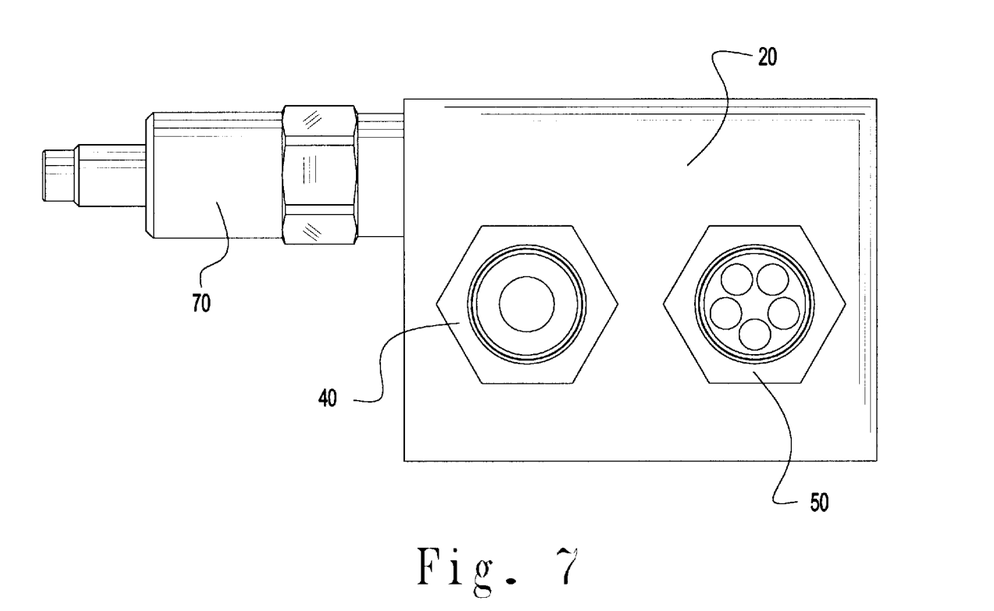
FIG. 7 is a rear view of the present invention with a control cartridge positioned within comprised of a relief valve.
Figure 8:
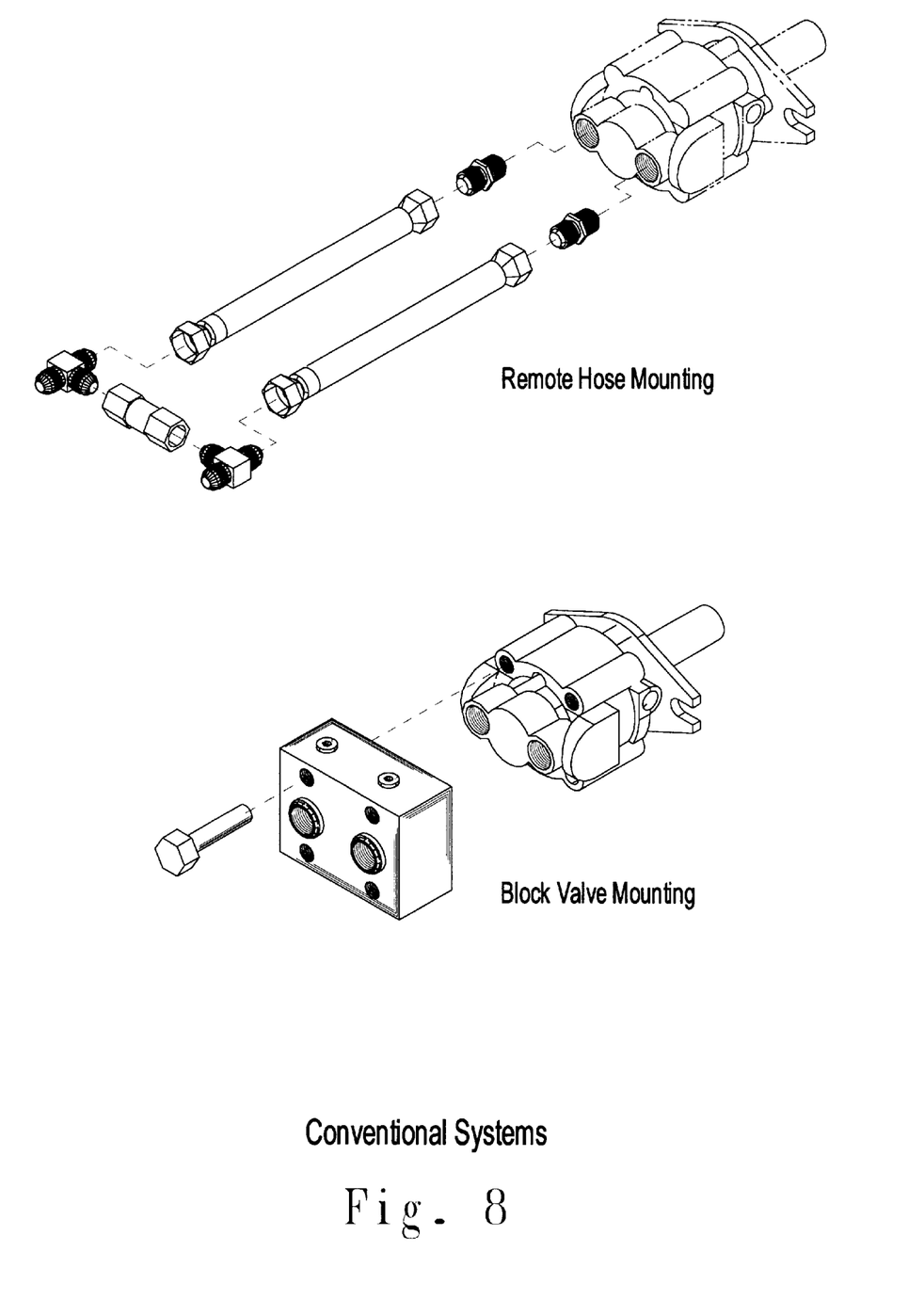
FIG. 8 is an upper perspective view of two conventional systems utilized for connecting to a hydraulic motor.

As shown in FIG. 5 of the drawings, a first bore 30 and a second bore 32 extend through the main body 20 from the rear portion to the front portion. The first bore 30 and the second bore 32 are parallel to one another as further shown in FIG. 5 of the drawings. As shown in FIG. 5 of the drawings, a pair of grooves within the bores 30, 32 are positioned within lumen of the bores formed for receiving an O-ring or similar sealing device.

The first bore 30 and the second bore 32 each have a longitudinal axis that coincide with a longitudinal axis for each of the corresponding ports 18, 19 as shown in FIG. 2 of the drawings. The longitudinal axes of bores 30, 32 and the ports 18, 19 are separated by a distance XX as shown in FIG. 2 of the drawings.

A third bore extends into a side of the main body 20 traverse to the bores 30, 32 for receiving a control cartridge 70. The third bore is connected to at least a portion of the first bore 30 and the second bore 32. The control cartridge 70 may be interchanged depending upon the type of valve assembly to be utilized such as a check valve or a relief valve. It can be appreciated that two stage, three stage and four stage valve systems may be constructed within the main body 20.

As shown in FIGS. 2, 3, 5, 6 and 7 of the drawings, a first female coupler 40 and a second female coupler 50 are rotatably positioned within the rear surface of the main body 20 of the first bore 30 and the second bore 32 respectively. The female couplers 40, 50 each have an engaging portion that extends outside of the main body 20 for allowing a tool such as a wrench to engage and manipulate such as a hexagonal shape.

The female couplers 40, 50 are interiorly threaded for receiving male couplers from hydraulic hoses or from another valve block assembly. As shown in FIG. 5, the second female coupler 50 may include a check valve within for preventing the backflow of hydraulic fluid.

Figure 3:
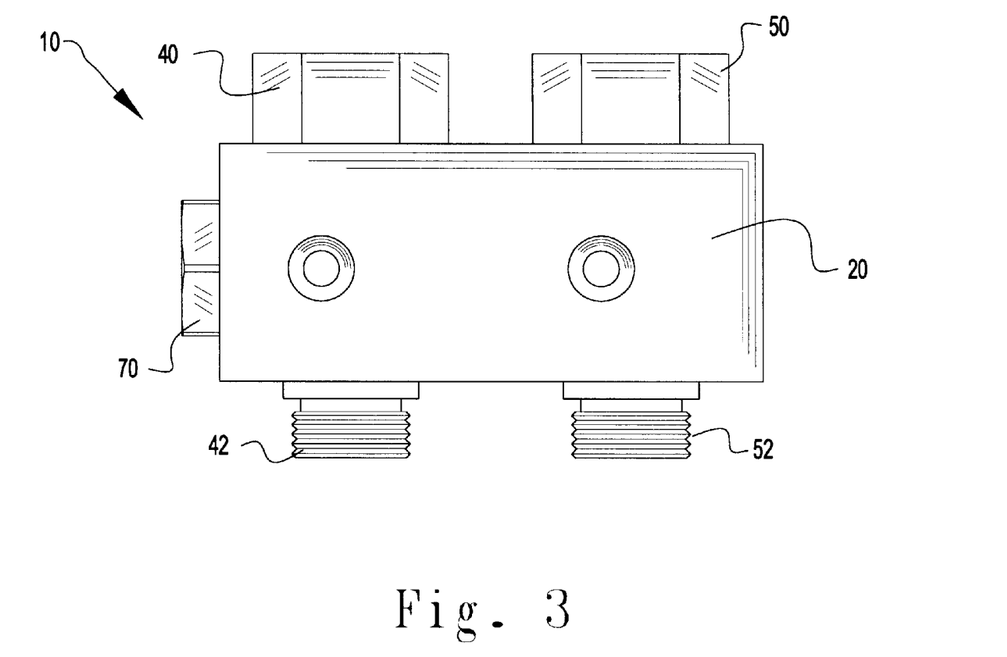
FIG. 3 is a top view of the present invention.
Figure 4:
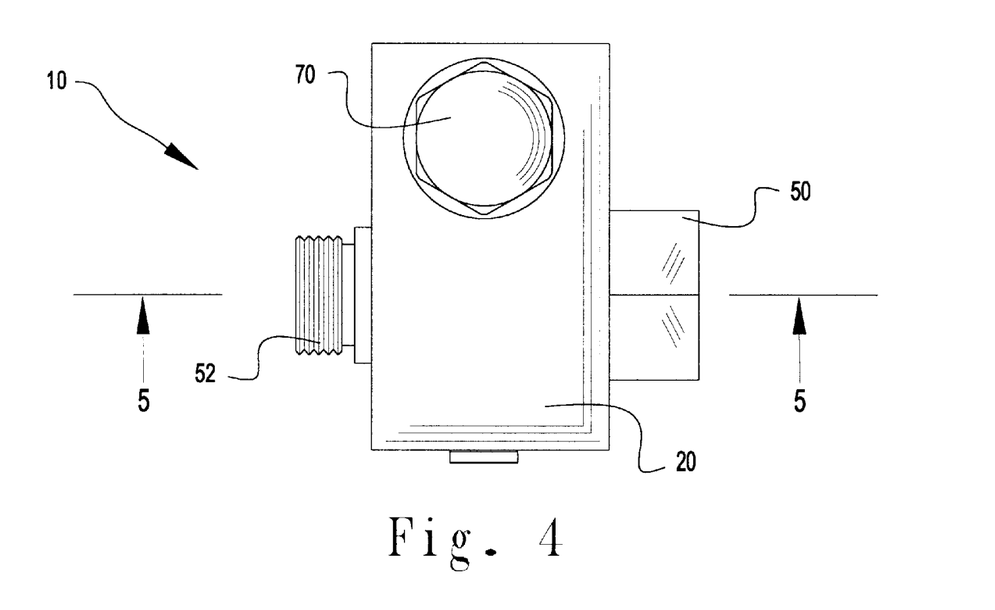
FIG. 4 is a side view of the present invention.

As shown in FIGS. 1, 3 and 5 of the drawings, a first male coupler 42 and a second male coupler 52 are rotatably positioned within the front surface of the main body 20 of the first bore 30 and the second bore 32 respectively opposite of the female couplers 40, 50. The male couplers 42, 52 have an exteriorly threaded portion that extends from outside of the main body 20 as best shown in FIGS. 3 and 5 of the drawings. The male couplers 42, 52 are preferably connected to the female couplers 40, 50 for allowing a user to engage the female couplers with a wrench thereby rotating the male couplers to threadably engage the ports 18, 19 of the hydraulic motor 12. However, the male couplers 42, 52 may be operated separately from the female couplers 40, 50 as discussed in the alternative embodiment below.

The exteriorly threaded portion of the male couplers 42, 52 is formed for threadably engaging the interiorly threaded ports 18, 19 of the hydraulic motor 12. As shown in FIG. 5 of the drawings, a conventional O-ring or other seal is utilized about the male couplers 42, 52 for sealing the male couplers 42, 52 against the housing 16 of the hydraulic motor 12 for preventing leakage of hydraulic fluid during operation.

As shown in FIG. 5 of the drawings, a plurality of conventional O-rings are preferably positioned within the grooves within the respective lumens of the bores 30, 32. The O-rings prevent leakage of hydraulic fluid about the female couplers 40, 50 and the male couplers 42, 52.

In an alternative embodiment, the male couplers 42, 52 rotate independent of the female couplers 40, 50. The male couplers 42, 52 include an exterior engaging portion similar to the female couplers 40, 50. It can be appreciated that the male couplers 42, 52 would include an interior engaging portion that can be accessed through the female couplers 42, 52 that receive a conventional wrench. The engaging portion of the male couplers 42, 52 is adjacent the front surface of the main body 20 with the exteriorly threaded portions of the male couplers 42, 52 extending outwardly from the engaging portion. In using the alternative embodiment, the user inserts a tool between the housing 16 and the main body 20 to engage the exterior engaging portion of the male couplers 42, 52 thereby allowing them to rotate the male couplers 42, 52 to threadably engage the ports 18, 19. It can be appreciated that the female couplers 40, 50 can be positioned upon any side of the main body 20 with the alternative embodiment since they are not physically connected to the male couplers 42, 52. It can also be appreciated that the female couplers 40, 50 can be comprised of any well-known coupling structure such as a nipple.

In use, the user positions the main body 20 in a position adjacent the housing 16 of the hydraulic motor 12 so that the male couplers 42, 52 are aligned with the ports 18, 19 of the hydraulic motor 12. The user then engages a tool to one of the female couplers 40, 50 and then rotates the selected female coupler 40, 50 so that the corresponding male coupler 42, 52 is simultaneously rotated for threadably engaging the corresponding port 18, 19 of the housing 16 of the hydraulic motor 12. The user then engages the other female coupler 40, 50 with the tool and rotates the remaining female coupler 40, 50 thereby rotating the corresponding male coupler 42, 52 within the corresponding port 18, 19 of the hydraulic motor 12. The user continues to rotate the female couplers 40, 42, 50, 52 intermittently or simultaneously until the male couplers 42, 52 are tightened within the ports 18, 19 of the hydraulic motor 12 with the O-ring sealed within. The user then may insert the desired control cartridge 70 depending upon the type of valve block assembly they desire to connect in relation to the hydraulic motor 12. The user then fluidly connects hydraulic hoses or another valve block assembly to the female couplers 40, 50 thereby allowing operation of the hydraulic motor 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A valve block mounting arrangement, comprising:
   a main body having a first bore and a second bore extending through said main body;
   a pair of male couplers rotatably positioned within said bores; and
   a pair of first couplers rotatably positioned within said bores opposite of said pair of male couplers, wherein said pair of first couplers each include an engaging portion extending from said main body, and wherein said engaging portion is formed for receiving a tool.

2. A valve block mounting arrangement, comprising:
   a main body having a first bore and a second bore extending through said main body;
   a pair of male couplers rotatably positioned within said bores; and
   a pair of first couplers rotatably positioned within said bores opposite of said pair of male couplers, wherein each of said pair of first couplers are connected respectively to one of said pair of male couplers within said bores.

3. The valve block mounting arrangement of claim 1, wherein said pair of first couplers include an engaging portion extending from said main body.

4. The valve block mounting arrangement of claim 2, wherein said engaging portion is formed for receiving a tool.

5. The valve block mounting arrangement of claim 3, wherein said engaging portion is hexagonal shaped.

6. The valve block mounting arrangement of claim 1, wherein said first bore and said second bore are parallel to one another.

7. The valve block mounting arrangement of claim 1, wherein said first bore and said second bore each have a longitudinal axis that is aligned with a longitudinal axis of a first port and a second port of a hydraulic motor.

8. The valve block mounting arrangement of claim 6, wherein said first bore and said second bore are parallel to one another.

9. The valve block mounting arrangement of claim 7, wherein said pair of first couplers include an engaging portion extending from said main body.

10. The valve block mounting arrangement of claim 8, wherein said engaging portion is formed for receiving a tool.

11. The valve block mounting arrangement of claim 1, wherein said bores include a plurality of sealing devices for fitting about said pair of male couplers and said first couplers.

12. A valve block mounting arrangement, comprising:
    a main body having a first bore and a second bore extending through said main body;
    a pair of first couplers rotatably positioned within said bores; and
    a pair of ports positioned within said main body fluidly connected to said first bore and said second bore.

13. The valve block mounting arrangement of claim 11, wherein said pair of first couplers include an exterior engaging portion extending from said main body.

14. The valve block mounting arrangement of claim 12, wherein said external engaging portion is formed for receiving a tool.

15. The valve block mounting arrangement of claim 13, wherein said external engaging portion is hexagonal shaped.

16. The valve block mounting arrangement of Claim 11, wherein said first bore and said second bore are parallel to one another.

17. The valve block mounting arrangement of Claim 11, wherein said first bore and said second bore each have a longitudinal axis that is aligned with a longitudinal axis of a first port and a second port of a hydraulic motor.

18. The valve block mounting arrangement of claim 16, wherein said first bore and said second bore are parallel to one another.

\* \* \* \* \*